United States Patent [19]

Niehaus et al.

[11] Patent Number: 4,852,083
[45] Date of Patent: Jul. 25, 1989

[54] DIGITAL CROSSBAR SWITCH

[75] Inventors: Jeffrey A. Niehaus; Robert G. Fleck, both of Dallas; Stephen Li; Bob D. Strong, both of Garland, all of Tex.

[73] Assignee: Texas Instruments Incorporated, Dallas, Tex.

[21] Appl. No.: 65,231

[22] Filed: Jun. 22, 1987

[51] Int. Cl.⁴ .............................................. H04M 3/18
[52] U.S. Cl. ..................................... 370/58; 370/85; 370/112; 340/825.03
[58] Field of Search ........................ 370/58, 59, 60, 64, 370/85, 67, 94, 53, 112; 364/200; 340/825.04, 825.03

[56] References Cited

U.S. PATENT DOCUMENTS

| | | | |
|---|---|---|---|
| 4,084,236 | 4/1978 | Chelberg et al. | 364/200 |
| 4,099,234 | 7/1978 | Woods et al. | 364/200 |
| 4,404,556 | 9/1983 | Messina et al. | 370/59 |
| 4,475,187 | 10/1984 | Barabas | 370/59 |

OTHER PUBLICATIONS

"The GF 11 Superconductors", IEEE, 1985, Beetem et al., pp. 108-115.
Digest of Technical Papers, 1987, IEEE International Solid State Circuits Conference, pp. 276, 277 and 425, Chi-Yuan Chin et al.

Primary Examiner—M. H. Paschall
Attorney, Agent, or Firm—Thomas R. FitzGerald; Leo N. Heiting; Melvin Sharp

[57] ABSTRACT

A digital crossbar switch for switching data from an input/output data bus to an internal data bus and to the same or another input/output data bus which includes a plurality of multiplexer logic units, an m-bit internal data bus coupled to each of said multiplexer logic units where m is an integer, and a plurality of n-bit input/output data buses one connected to each of the multiplexer logic units were n is an integer. The switch further includes an m/n to 1 multiplexer, where m/n is an integer, in each multiplexer logic unit. The m/n to 1 multiplexer has an input control to the internal data bus and an output coupled to a corresponding one of the input/output data buses and is operative in response to a configuration control signal to switch a selected n-bits of data from the internal data bus to the corresponding input/output data bus. A memory storage for storing configuration control signals is coupled to the m/n to 1 multiplexer.

24 Claims, 3 Drawing Sheets

DIGITAL CROSSBAR SWITCH

BACKGROUND OF THE INVENTION

The present invention relates to a high speed digital crossbar switch for selecting and transferring data from multiple sources to multiple destinations. More particularly, the present invention relates to a crossbar switch which can be dynamically programmed so that it is suitable for use in reconfigurable networks for fault-tolerant routing.

The conventional Von Neumann computer architecture utilizes only a single (or a few) transmissions to be broadcast at any given time. Such machines use hard wired switching networks which limit their application range. This limitation in transmission capability translates into computers which are unable to perform to the extent required for the solution of such complex problems as integrated circuit simulation, global weather predictions, monte carlo simulations in solid state particle physics or fault simulation of a nuclear reactor.

Accordingly, it is an object of the invention to provide a digital crossbar switch capable of selecting and transferring data from multiple sources to multiple destinations. It is a further object to provide a digital crossbar switch that can be dynamically reprogrammed.

SUMMARY OF THE INVENTION

According to the present invention there is provided a digital crossbar switch which includes a plurality of multiplexer logic units, a preselected number of input/output data buses coupled to each of the logic units, and an internal data bus coupled to each of the logic units for transmitting data to and from each of the multiplexer logic units. Each logic unit has an input multiplexer for controlling the passage of the preselected number of inputs to the internal data bus and a multiplexer having its input coupled to the internal data bus. A control source controls the transmission of bits from the internal data bus to the output of an associated logic unit. An input multiplexer control source controls the passage of input signals to the internal data bus.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
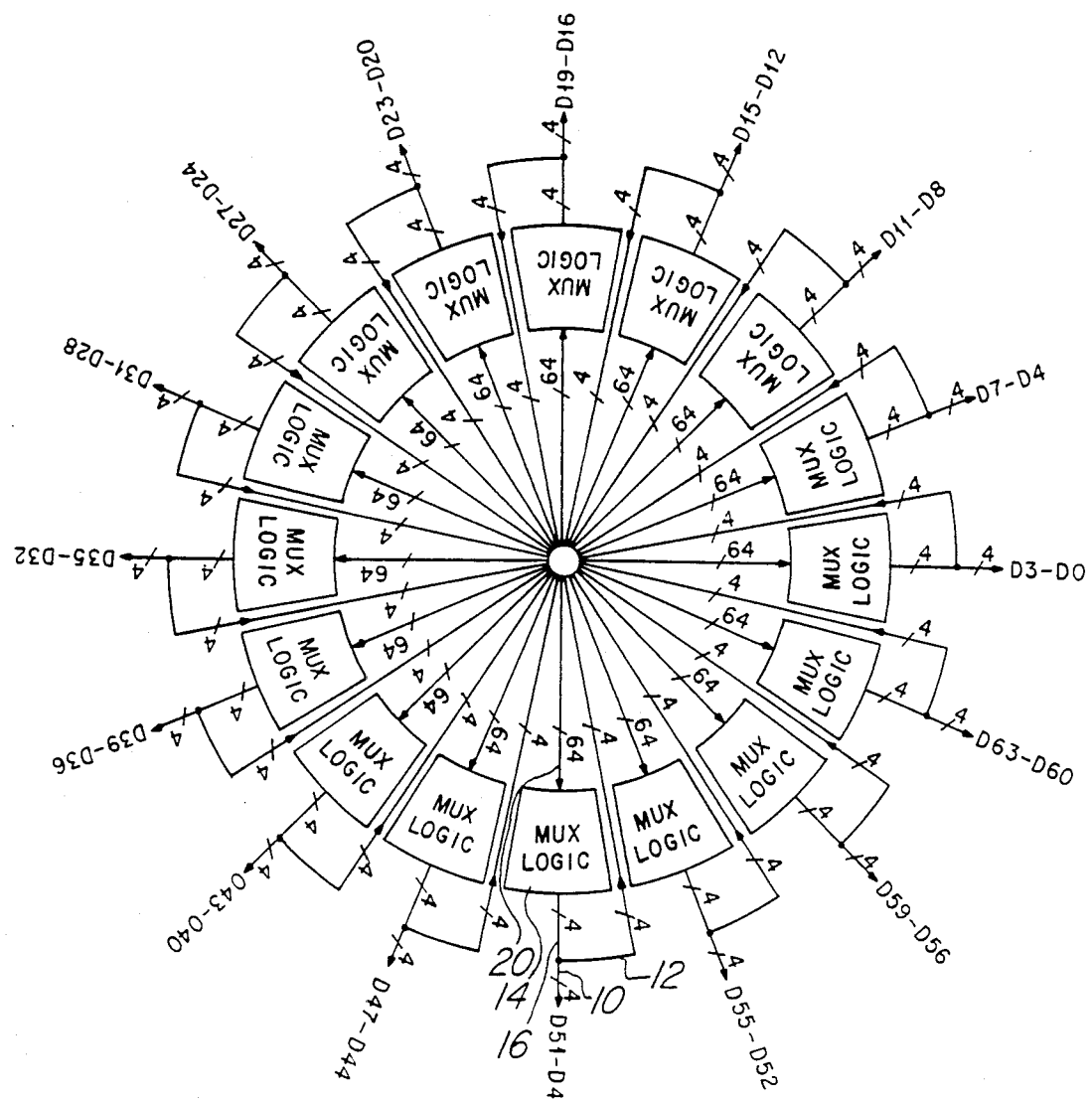
FIG. 1 is a schematic diagram of a 64 bit digital crossbar switch in which the data bus is represented as being at the center and connected to each multiplexer logic unit.

Referring to FIG. 1 there is shown in representative form only a 64 bit digital crossbar switch which has 16 individual multiplexer logic units 14 connected to corresponding sets of 4 input/output pins by line 10 and line 16. Input data can be sent directly to a 64-bit data bus along 4-bit line 12 and data from the data bus can be received by each logic unit 14 along 64-bit line 20.

Figure 2:
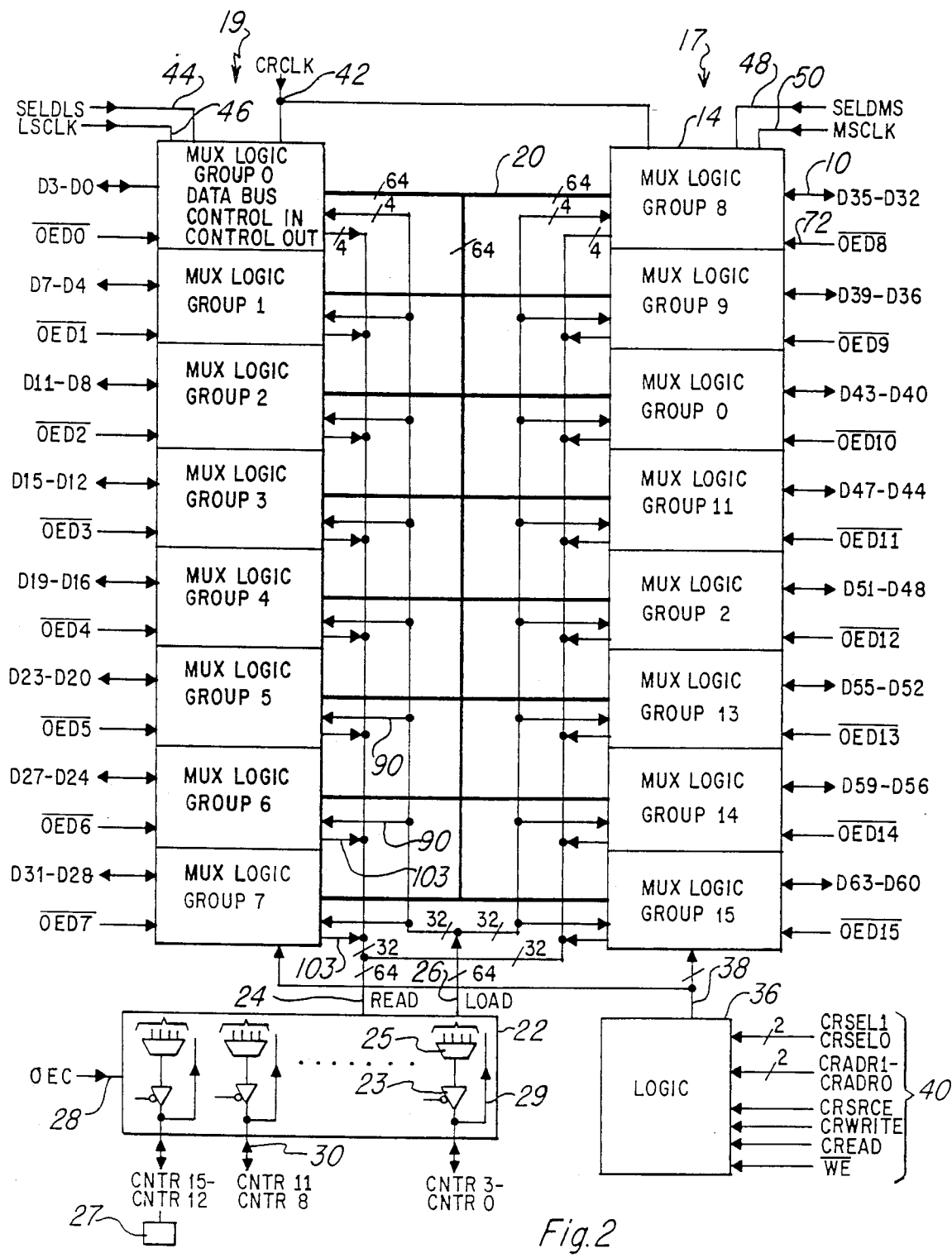
FIG. 2 is a more detailed block diagram of a preferred embodiment of a digital crossbar switch.

Referring to FIG. 2, 64-bit internal data bus 20 connects to each of the 16 multiplexer logic units 14. Four-bit input/output data buses 10 are connected to each multiplexer logic unit 14 for inputting data or for receiving output data from the corresponding logic unit 14. A data output enable control signal OED' on line 72 enables or disables the outputting of channels of data from a 16:1 multiplexer 62 through a buffer 70 onto input/output data bus 10. While the number of bits in input/output data bus 10 is 4 in practice this number, (hereinafter referred to as the channel width), may be any convenient number. The internal data bus 20 is organized into two halves. The first half, MSH, corresponds to the most significant half, (D63-D32), and the second half, LSH, corresponds to the least significant half, (D31-D0). However, the internal data bus 20 could be partitioned into any number of parts. In addition, the multiplexer logic groups are also arranged into two groups of 8 each. One group 17 corresponds to the most significant group while the other corresponds to the least significant group 19. While such an organization is useful for functions such as LSH/MSH swapping other organizations are clearly possible involving any desired rooting permutation between the channels.

A control input/output unit 22 consists of 16 buffer circuits 23 each having an output enable line connected to an OEC' signal line 28. Each buffer circuit 23 has its input connected to an output of a corresponding 4:1 multiplexer 25 and its output connected by a line 30 to a CNTR pin 27. Multiplexer 25 is controlled by the control address select signals CRADR1-CRADR0. A bypass line 29 connects line 30 directly to a load bus 26 for loading in data to the multiplexer logic units 16 bits at a time. Control words are read out of the control input/output 22 16-bits at a time on line 26 into the multiplexer logic units 14 in response to a control source signal CRSRCE being low. Control words in a program can also be read back from the multiplexer logic units 14. In this case output enable control signal OEC' is taken low. The control address select signals CRADR1-CRADR0 select the four addresses of the 16-bit words to be read out on the CNTR outputs. The control select signals CRSEL0 and CRSEL1 control the passage of control information in each associated multiplexer logic unit 14. The other logic signals are explained below with reference to FIG. 3 which is a detailed block diagram of each multiplexer logic unit 14.

Figure 3:
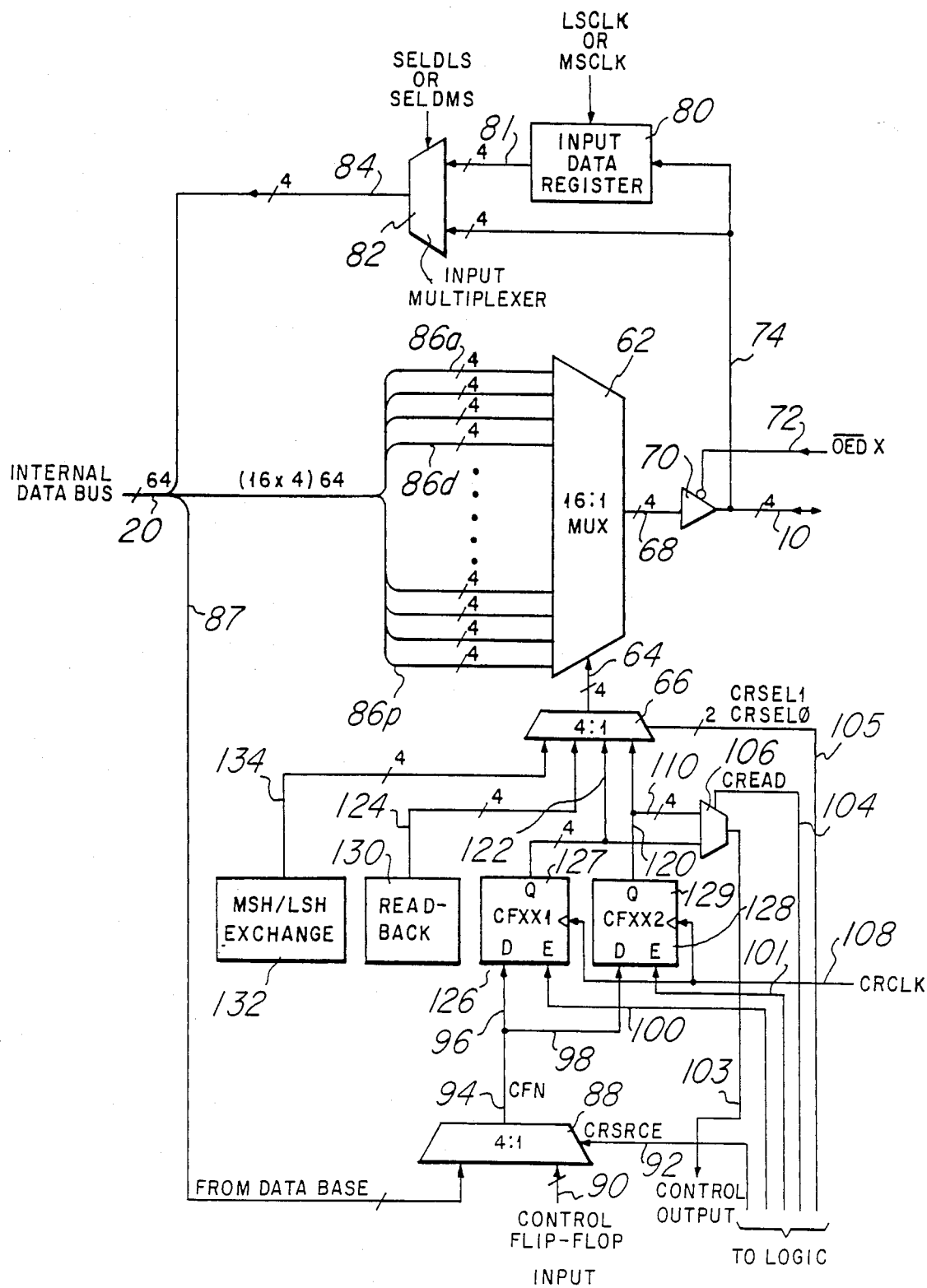
FIG. 3 is a schematic diagram of each multiplexer logic unit in the switch.

Referring to FIG. 3, each multiplexer logic unit 14 consists of a 16:1 multiplexer 62 having 16 4-bit input lines connected to a 64 bit data bus 20 and having an output on 4-bit line 68. Line 68 inputs to a three-state buffer 70. The output of buffer 70 connects to 4-bit input/output data bus 10. Data output enable signal OED' inhibits the output of data from buffer 70 when high and places it in a state in which it has a high output impedance. The input/output data bus 10 is coupled by line 74 to both an input of input multiplexer 82 and to the input of an input data register 80. Clock signals MSCLK and LSCLK are used to load the input registers 80 corresponding to the MSH 17 and LSH 19 group of multiplexer units 14 with the correct sequence of 4-bit data groups.

The select data least significant, SELDLS, or select data most significant, SELDMS, control signals control the selection of LSH and MSH data, respectively, from either the input data register 80 or real-time input on line 74. Data groups output from input multiplexer 82 on line 84 are directed to the internal data bus 20.

The passage of data through multiplexer 62 is controlled by signals on 4-bit line 64 from 4:1 multiplexer 66. There are 4 different inputs to multiplexer 66 the selection of which is controlled by multiplexer control select signals, CRSEL1 and CRSEL0, on line 105. The input on line 134 from MSH/LSH Exchange 132 when transmitted through multiplexer 66 results in an exchange or swap of corresponding groups between the MSH and the LSH of the 64 bit data word at the input of multiplexer 62. The input on line 124 from readback unit 130 results in a simple transmission or the 64-bit word through the 16:1 multiplexer 62 without alteration.

The remaining two inputs to multiplexer 66 come from two control flip-flop banks CF1 126 and CF2 128. Each CF bank 126 and 128 consists of four D-type edge-triggered flip-flops. Each CF bank can store a four-bit word to be used in selecting the output of the 16:1 multiplexer 62. Thus, a total of 16 words can be stored in each flip-flop bank consisting of all 16 CF1 or CF2 words. Inputs to the flip flop banks 126 and 128 come from a control input multiplexer 88. The inputs to multiplexer 88 come from either a 4 bit line 87 connected to internal data bus 20 from 4 bit line 90 of FIG. 3 which connects to a set of 4 of lines 29 of the control input/output unit 22. When a bank 126 or 128 of flip-flops corresponding to all 16 CF words in the multiplexer logic units 14 are to be loaded, the 16 control words (or 64 bits) are loaded in four cycles in response to a control clock signal CRCLK on line 108 when the words come through control unit 22. When data from the internal data bus 20 is loaded it comes in a group of 4 bits on line 87 and is loaded into one of the banks of flip flops 126 or 128 in a single clock cycle. The signal CRWRITE controls the destination of the output of multiplexer 88 into either CF1 126 or CF2 128.

The 4-bit words stored in each CF bank 126 and 128 can be read out through a 2:1 multiplexer 106 on line 103. The multiplexer 106 is controlled by a read control signal CREAD on line 104 which selects one of two inputs from either control word 127 or 129. Line 103 couples to the input of 4:1 multiplexer 25 shown in FIG. 2.

The output of 4:1 multiplexer 66, in response to a control select signal CRSEL1 and CRSEL0, is directed along a 4-bit line to a control input of 16:1 multiplexer 62 and directs the passage of information on lines 86 through the multiplexer 62.

Control of the input and output multiplexers determines the input-to-output pattern for the entire crossbar switch. Many different switching configurations can be set up by selecting the appropriate data inputs and by programming the control flip flops to determine the outputs from the 16:1 multiplexers. The output control source select CRSEL has the effect shown in table 1. In addition to the two banks of programmable flip-flops 126 and 128, two hard-wired control functions can be selected. The MSH/LSH exchange directs the input groups from each half of the switch to the control flip flops or data outputs directly opposite, for example, D23-D20←→ D55-D52. The read-back function causes all 64 input bits to be output on the same input-/output data bus lines on which they were input.

TABLE 1

| CRSEL1 | CRSEL0 | Control Source Select |
|---|---|---|
| L | L | Flip-flop bank 1 (programmable) |
| L | H | Flip flop bank 2 (programmable) |
| H | L | MSH/LSH exchange |
| H | H | READ-BACK (output echoes input) |

A CF unit can store a four-bit word (CFN3-CFN0) to select the output of the 16 to 1 multiplexer. One control word is loaded in each CF unit, for a total of 16 words in each flip-flop bank. Table 2 lists the output multiplexer control words, which can be loaded either 16 bits at a time on the control I/Os (CNTR15-CNTR0) or all 64 bits at once on the data inputs (D63-D0). Each control word in Table 2 can be stored in a CF bank 126 or 128 and sent as an internal control signal to the 16 to 1 multiplexer 62. For example, any CF control word loaded with "LHHH" can be used to select inputs D31-D28 as the output from the 16 to 1 multiplexer 62, or all 16 CF words 127 and 129 in either bank 126 or 128, respectively, can be loaded with "LHHH" and the same output will be selected by the entire switch.

TABLE 2

| Internal Signals | | | | Input Data Selected as |
|---|---|---|---|---|
| CFN3 | CFN2 | CFN1 | CFN0 | Multiplexer Output |
| H | H | H | H | D63-D60 |
| H | H | H | L | D59-D56 |
| H | H | L | H | D55-D52 |
| H | H | L | L | D51-D48 |
| H | L | H | H | D47-D44 |
| H | L | H | L | D43-D40 |
| H | L | L | H | D39-D36 |
| H | L | L | L | D35-D32 |
| L | H | H | H | D31-D28 |
| L | H | H | L | D27-D24 |
| L | H | L | H | D23-D20 |
| L | H | L | L | D19-D16 |
| L | L | H | H | D15-D12 |
| L | L | H | L | D11-D8 |
| L | L | L | H | D7-D4 |
| L | L | L | L | D3-D0 |

The source for loading control words in banks 126 and 128 is selected by CRSRCE 92. An enable signal on lines 100 and 101 selects whether word 127 or 129 is loaded for a given multiplexer unit 14. The control signal values and corresponding source and destination of loading are shown in Table 3. In the case of loading control words into flip-flop banks 126 and 128 from data input/output buses 10, data groups (in this case groups of 4-bits) are sent to the internal data bus 20 by one half of the multiplexer logic units 14 of the crossbar switch and are loaded into the control flip-flops of corresponding units 14 of the other half of the switch. For instance, data inputs D3-D0 go to the data bus and then to the control flip flops for data outputs D35-D32, while the inputs D35-D32 are sent to the control flip-flops for D3-D0.

TABLE 3

| CRSRCE | CRWRITE | Source and Destination |
|---|---|---|
| L | L | CNTR inputs to flip-flop bank 126 |
| L | H | CNTR inputs to flip-flop bank 128 |
| H | L | Data inputs to flip-flop bank 126 |
| H | H | Data inputs to flip-flop bank 128 |

When a bank of flip-flops 126 or 128 are being loaded from the data inputs, the four signals, WE', CRSRCE, CRWRITE, and the control flip-flop clock CRCLK are used in combination. In this case the resulting EN1, shown in Table 6 using input group D63–D60 as the group of bits being broadcast.

TABLE 6

| Inst. No. | CRSRCE | CRVRTE | CRADR1 | CRADR0 | CNTR I/O NUMBERS | | | | CRSEL1 | CRSEL0 |
|---|---|---|---|---|---|---|---|---|---|---|
| | | | | | 15–12 | 11–8 | 7–4 | 3–0 | | |
| 1 | 0 | 0 | 0 | 0 | 1111 | 1111 | 1111 | 1111 | X | X |
| 2 | 0 | 0 | 0 | 1 | 1111 | 1111 | 1111 | 1111 | X | X |
| 3 | 0 | 0 | 1 | 0 | 1111 | 1111 | 1111 | 1111 | X | X |
| 4 | 0 | 0 | 1 | 1 | 1111 | 1111 | 1111 | 1111 | X | X |
| 5 | X | X | X | X | XXXX | XXXX | XXXX | XXXX | 0 | 0 |

| Inst. No. | WE' | SELDMS | SELDLS | OED15–OED0 | | | | OEC | CRCLK |
|---|---|---|---|---|---|---|---|---|---|
| 1 | 0 | X | X | XXXX | XXXX | XXXX | XXXX | 1 | |
| 2 | 0 | X | X | XXXX | XXXX | XXXX | XXXX | 1 | |
| 3 | 0 | X | X | XXXX | XXXX | XXXX | XXXX | 1 | |
| 4 | 0 | X | X | XXXX | XXXX | XXXX | XXXX | 1 | |
| 5 | X | 1 | X | 1000 | 0000 | 0000 | 0000 | X | None |

EN2, . . . , EN32 output signals are applied to the control words 127 and 129 of each logic unit 14 on lines 100 and 101. Table 4 shows the pattern of exchange when a bank of flip flops is loaded from data inputs.

TABLE 4

| Control Flip-Flop Groups | Data Outputs Affected | CNTR Inputs to Control Flip-Flops | Data Inputs to Control Flip-Flops |
|---|---|---|---|
| CF15 | D63–D60 | | D31–D28 |
| CF14 | D59–D56 | CNTR15– | D27–D24 |
| CF13 | D55–D52 | CNTR12 | D23–D20 |
| CF12 | D51–D48 | | D19–D16 |
| CF11 | D47–D44 | | D15–D12 |
| CF10 | D43–D40 | CNTR11– | D11–D8 |
| CF9 | D39–D36 | CNTR8 | D7–D4 |
| CF8 | D35–32 | | D3–D0 |
| CF7 | D31–D28 | | D63–D60 |
| CF6 | D27–D24 | CNTR7– | D59–D56 |
| CF5 | D23–D20 | CNTR4 | D55–D52 |
| CF4 | D19–D16 | | D51–D48 |
| CF3 | D15–D12 | | D47–D44 |
| CF2 | D11–D8 | CNTR3– | D43–D40 |
| CF1 | D7–D4 | CNTR- | D39–D36 |
| CF0 | D3–D0 | | D35–D32 |

The Control Input/Output 22 shown in FIG. 2 can load four control words per CRCLK cycle to the flip flop addresses (CFXX where XX stands for the number of the control flip-flop) selected by CRADR1 and CRADR0. The same address signals can be used to read out the flip-flop settings except that OEC' is pulled low and no CRCLK signal is needed. The control signals used to load the control flip-flops from the CNTR input/outputs 30 of the control input/output unit 22 are shown in Table 5.

TABLE 5

| CRADR1 | CRADR0 | WE | CRCLK | CONTROL (CNTR) I/O NUMBERS | | | |
|---|---|---|---|---|---|---|---|
| | | | | 15–12 | 11–8 | 7–4 | 3–0 |
| L | L | L | | CF12 | CF8 | CF4 | CF0 |
| L | H | L | | CF13 | CF9 | CF5 | CF1 |
| H | L | L | | CF14 | CF10 | CF6 | CF2 |
| H | H | L | | CF15 | CF11 | CF7 | CF3 |
| X | X | H | X | Inhibit write to flip-flops | | | |

Programming the crossbar switch involves the use of a few control signals to set up control words in the banks of flip flops 126 and 128. By way of example, if loading control words from input/output 30, the microcode sequence necessary to broadcast any of the 16 data input groups to the other 15 data groups for output is The low signal on CRSRCE 92 selects CNTR15–CNTR0 in control input/output 22 as the input source, and the low signal on CRWRITE causes line 100 to select flip-flop bank 126 as the destination. Table 2 shows that to select data on D63–D60 as the output nibble the four bits in the control word CFN3–CFN0 must be high; therefore the CNTR15–CNTR0 inputs are coded high. The four microcode instructions shown in Table 6 load the same control word from CNTR15–CNTR0 into all 16 CF words of bank 126.

Once the control flip-flops have been loaded, the switch can be used to broadcast bit group D63–D60 as programmed. The microcode instruction to execute the broadcast is shown as the last instruction in Table 6. The data to be broadcast is input on D63–D60. The high signal on SELDMS selects a real-time data input for the broadcast. MSCLK and LSCLK as shown in FIGS. 2 and 3 can be used to load the input register 80 if the input group is to be retained. No register clock signals are needed if the input data is not being stored.

The bank of control flip-flops not selected as a control source can be loaded with new control words or read out on CNTR15–CNTR0 while the switch is operating. For example, the MSH data inputs can be used to load flip-flop bank 128 of the LSH while bank 126 of the LSH is controlling data input/output.

A second, more complicated example of the loading and use of control words to program the crossbar switch involves programming the crossbar switch to swap corresponding groups between the MSH and the LSH (first group in the LSH for first group in the MSH and so on). This swap can be implemented using the hard-wired logic circuit selected when the control select signal CRSEL1 is high and CRSEL0 low. Programming this swap without using the MSH/LSH exchange logic unit 132 requires loading a different control word into each mux logic group.

This programming proceeds by each group in one half, either LSH or MSH, selecting as output the input from the corresponding group in the other half. The input group from D35-D32 is to be output on D3-D0, the input from D3-D0 is output on D35-D32, and so on for the remaining group. As shown in Table 2, the flip-flops for D3-D0 have to be set to 1000 and the D35-D32 inputs must be low, the CF control words involved in this switching pattern are shown in Table 7 below.

TABLE 7

| Control Flip-Flop Words | CNTR Inputs to Load Flip-Flops | Control Word Loaded | Results |
|---|---|---|---|
| CF15 |  | 0111 | D31-D28 → D63-D60 |
| CF14 | CNTR15- | 0110 | D27-D24 → D59-D56 |
| CF13 | CNTR12 | 0101 | D23-D20 → D55-D52 |
| CF12 |  | 0100 | D19-D16 → D51-D48 |
| CF11 |  | 0011 | D15-D12 → D47-D44 |
| CF10 | CNTR11- | 0010 | D11-D8 → D43-D-40 |
| CF9 | CNTR8 | 0001 | D7-D4 → D39-D36 |
| CF8 |  | 0000 | D3-D0 → D35-D32 |
| CF7 |  | 1111 | D63-D60 → D31-D28 |
| CF6 | CNTR7- | 1110 | D59-D56 → D27-D24 |
| CF5 | CNTR4 | 1101 | D55-D52 → D23-D20 |
| CF4 |  | 1100 | D51-D48 → D19-D16 |
| CF3 |  | 1011 | D47-D44 → D15-D12 |
| CF2 | CNTR3- | 1010 | D43-D40 → D11-D8 |
| CF1 | CNTR0 | 1001 | D39-D36 → D7-D4 |
| CF0 |  | 1000 | D35-D32 → D3-D0 |

With this list of control words and the signals in Table 5, the 16-bit control inputs on CNTR15-CNTR0 can be arranged to load the control flip-flops in four cycles. Table 8 shows the microcode instructions for loading the control words and executing the exchange.

TABLE 8

| Inst. No. | CRSRCE | CRVRTE | CRADR1 | CRADR0 | CNTR I/O 15-12 | 11-8 | 7-4 | 3-0 | CRSEL | CRSEL0' |
|---|---|---|---|---|---|---|---|---|---|---|
| 1 | 0 | 1 | 0 | 0 | 0100 | 0000 | 1100 | 1000 | X | X |
| 2 | 0 | 1 | 0 | 1 | 0101 | 0001 | 1101 | 1001 | X | X |
| 3 | 0 | 1 | 1 | 0 | 0110 | 0010 | 1110 | 1010 | X | X |
| 4 | 0 | 1 | 1 | 1 | 0111 | 0011 | 1111 | 1011 | X | X |
| 5 | X | X | X | X | XXXX | XXXX | XXXX | XXXX | 0 | 1 |

| Inst. No. | WE' | SELDMS | SELDLS | OEDIS-OED0 | OEC | CRCLK |
|---|---|---|---|---|---|---|
| 1 | 0 | X | X | XXXX XXXX XXXX XXXX | 1 |  |
| 2 | 0 | X | X | XXXX XXXX XXXX XXXX | 1 |  |
| 3 | 0 | X | X | XXXX XXXX XXXX XXXX | 1 |  |
| 4 | 0 | X | X | XXXX XXXX XXXX XXXX | 1 |  |
| 5 | X | 0 | 0 | 0000 0000 0000 0000 | X | None |

In Table 8, group 128 of flip-flops is being programmed. Group 128 is selected by taking CRWRITE high and leaving CRSRCE low (see Table 3) when the control words are loaded on CNTR15-CNTR0. With write enable WE' held low, the control clock CRCLK is used to load the four sets of control words. Once the flip-flops are loaded, data can be input on D63-D0 and the programmed pattern of output selection can be executed. A microinstruction to select registered data inputs and group 128 as the control source is shown as the last instruction in Table 8.

The control flip-flops could also have been loaded from the data input groups in one control clock CRCLK cycle. All control words to set up a switching pattern should be loaded before the bank of flip-flops is selected as control source. Table 5 shows how input groups from one half are mapped onto the control flip-flops of the other half. The microcode instructions to load group 126 with the 16 control words in one cycle are presented in Table 9 below.

TABLE 9

| CRSRCE | CRWRITE | WE' | SELDMS | SELDLS | OED15'-OED0' | CRLK |
|---|---|---|---|---|---|---|
| 1 | 0 | 0 | 1 | 1 | 1111 1111 1111 1111 |  |

These control groups may be loaded from the input as a 64-bit real-time input word or as two 32-bit words stored previously. To use stored control words, MSCLK and LSCLK are used to load the LSH and MSH input registers with the correct sequence of control groups. Whenever the flip-flops are loaded from the data inputs, all 64 bits of control data must be present when the CRCLK is used so that all control groups in a program are loaded simultaneously. Table 10 presents the three microcode instructions to load the MSH and LSH input registers and then to pass the registered data to flip-flop bank 128.

TABLE 10

| Inst. No. | CRSRCE | CRWRITE | WE' | SELDMS | SELDLS | OED15'-OED0' | CRCLK | MSCLK | LSCLK | Inputs Loaded |
|---|---|---|---|---|---|---|---|---|---|---|
| 1 | X | X | X | X | X | 1 | None |  | None | D63-D32 |
| 2 | X | X | X | X | X | 1 | None | None |  | D31-D0 |
| 3 | 1 | 1 | 0 | 0 | 0 | X |  | None | None | X |

The control words in a program can also be read back from the flip-flops using the CNTR outputs. Four instructions are necessary to read the 64 bits in a bank of flip-flops out on CNTR15-CNTR0. OEC' is taken low while no CRCLK signal is required. The high signal on CREAD selects bank 128 of flip-flops and CRADR1-- CRADR0 select in sequence the four addresses of the 16-bit words to be read out on the CNTR outputs. Table 11 shows the four microcode instructions.

TABLE 11

| Inst. No. | CREAD | OEC' | CRADR1 | CRADR0 | WE' | CNTR I/O NUMBERS 15-12 | 11-8 | 7-4 | 3-0 | CRCLK |
|---|---|---|---|---|---|---|---|---|---|---|
| 1 | 1 | 0 | 0 | 0 | X | 0100 | 0000 | 1100 | 1000 | NONE |
| 2 | 1 | 0 | 0 | 1 | X | 0101 | 0001 | 1101 | 1001 | NONE |
| 3 | 1 | 0 | 1 | 0 | X | 0110 | 0010 | 1110 | 1010 | NONE |
| 4 | 1 | 0 | 1 | 1 | x | 0111 | 0011 | 1111 | 1011 | NONE |

The crossbar switch herein performs a range of switching operations, some controlled by hard-wired control functions and others programmed to suit the application. Since it can be dynamically reprogrammed, the crossbar switch supports alternate routing schemes which require reconfigurable data paths among multiple sources and destinations.

The crossbar switch can be used to switch data and address interconnections among multiple processors and memories in a reconfigurable architecture. This architecture combines groups of processors and memories to form larger processor elements which can be configured to perform parallel processing. These same processing elements can be reconfigured dynamically to support alternative networks or processing structures.

The crossbar switch in the embodiment herein could be cascaded to switch data from up to sixteen buses having any number of bits in each bus by simply coupling the bits in each bus in groups of 4 to as many switches as are required to handle the number of bits involved. The number of input/output data buses can also be expanded to any required number by coupling the required number of switches. Although groups of 4 bits have been described in the embodiment herein clearly any number of bits could be used in a channel. Also the number of ports could be increased. In addition, although only two groups of control flip-flops have been disclosed, more than two could be used to obtain an even larger number of different programmable switching patterns.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A digital crossbar switch for switching data between an internal data bus and one or more input/output data buses, comprising:
   a plurality of multiplexer logic units;
   an m-bit internal data bus coupled to each of said multiplexer logic units where m is an integer;
   a plurality of n-bit input/output data buses, one connected to each of said multiplexer logic units where n is an integer;
   a m/n to 1 multiplexer, where m/n is an integer, each multiplexer logic unit having an input coupled to said internal data bus and an output coupled to a corresponding one of said input/output data buses and operative in response to a configuration control signal to switch a selected n-bits of data from said internal data bus to the corresponding input-/output data bus; and
   memory storage for configuration control signals coupled to said m/n to 1 multiplexer.

2. A switch according to claim 1, wherein at least a portion of said memory storage is programmable.

3. A switch according to claim 1, including a control input/output unit coupled to each of said multiplexer logic units 4. A switch according to claim 1, including an input data register coupled to said input/output data bus in each of said multiplexer logic units for storing input data therein and inputting said data at a selected subsequent time.

5. A switch according to claim 4, including an input multiplexer in each of said multiplexer logic units having one input connected to a corresponding input/output data bus and another connected to an output of said input data register and operative in response to a control signal to select either real time input or input from said input data register.

6. A switch according to claim 3, including a multiplexer in each of said multiplexer logic units having a first input connected to said internal data bus and a second input connected to said control input/output unit.

7. A switch according to claim 6, including a multiplexer coupled to said memory storage for reading out control words stored therein.

8. A switch according to claim 2, wherein said memory storage includes a bank of programmable flip-flops.

9. A switch according to claim 1, wherein said memory storage includes a preselected permanent control word.

10. A switch according to claim 1, wherein said memory storage includes permanent control words for transceiver and read-back functions.

11. A digital crossbar switch, for transferring data between an internal data bus and one or more input/output data buses, comprising:
   an internal data bus;
   a plurality of multiplexer logic units each coupled to said internal data bus;
   a plurality of input/output data buses, one being coupled to each of said multiplexer logic units, wherein number of bits in each of said input/output data buses is "n" and the total number of bits in all of said input/output data buses equals "m", the number of bits in said internal data bus;
   a control input/output unit coupled to each of said multiplexer logic units for controlling the transfer of configuration control bits into and out of said multiplexer logic units;
   a logic controller coupled to each of said multiplexer logic units for transmitting logic control signals into said multiplexer logic units;
   a data input controller coupled to a corresponding data bus an in response to selected control signals to pass input data to said internal data bus;
   a data output controller in each of said multiplexer logic units coupled to said internal data bus for selectively transmitting n bits of data from said internal data bus to an input/output data bus of an associated multiplexer logic unit in accordance with a selected control word; and control word memory coupled to said data output controller for storing switching configuration instructions and applying a selected control word in accordance with a selected logic signal from said logic controller.

12. A switch according to claim 11, wherein said data output controller is an m/n to 1 multiplexer.

13. A switch according to claim 12, including a source selector switch having an output coupled to an input of said control word memory and inputs coupled to said internal data bus and to said control input/output unit and operative in response to a selected source logic signal to select data to be stored in said memory from either said internal data bus or said control input/output unit.

14. A switch according to claim 11, including a memory output controller coupled to said memory and to said logic controller for transmitting memory control words selected in response to control signals from said logic controller.

15. A switch according to claim 11, including an input data buffer having an input coupled to said input/output data bus and an output coupled to said input multiplexer for storing input data for later transmission through said input multiplexer.

16. A switch according to claim 11, including an isolator coupled to an output of said m/n to 1 multiplexer and having an output connected to said input/output data bus in each of said multiplexer logic units.

17. A switch according to claim 11, wherein said control word memory includes a bank of programmable flip-flops.

18. A switch according to claim 15, wherein said input data buffer is a register.

19. A switch according to claim 13, including a data input buffer for temporarily storing input data from said input/output data bus and said data input controller and said selector switch operative in response to selected control signals to obtain control words for storage in control word memory from either data input on said input/output data bus or from said control input/output unit.

20. A switch according to claim 11, including a clock signal for controlling the transmission of data through each multiplexer.

21. A switch according to claim 11, including separate clock signals for each group of a selected number of groups of said multiplexer logic units.

22. A switch according to claim 11, including three state buffers on the output of each of said data output controllers and on the output from each of said control input/output units.

23. A digital crossbar switch for switching data between an internal data bus and one or more input/output data buses, comprising:

plurality of multiplexer logic units:

an m-bit internal data bus coupled to each of said multiplexer logic units where m is an integer;

a plurality of n-bit input/output data buses one connected to each of said multiplexer logic units where n is an integer;

a m/n to 1 channel selector, where m/n is an integer, in each multiplexer logic unit having an input connected to said internal data bus and an output coupled to a corresponding one of said input/output data buses and operative in response to a configuration control signal to switch a selected channel of data from said internal data bus to the corresponding input/output data bus;

memory storage for configuration control signals coupled to said m/n to 1 multiplexer; and an input selector having an input coupled to a corresponding one of said input/output data buses and an output coupled to said internal data bus for transmitting a channel of data from said input/output data bus to said internal data bus in response to an input selector control signal.

24. A switch according to claim 23, wherein data channels of said internal data bus are coupled to said multiplexer logic units so that data can be sent from a given multiplexer logic unit to one or more other multiplexer logic units along alternative multiple data paths in response to channel selector and input selector control signals.

* * * * *